United States Patent [19]

Neal et al.

[11] Patent Number: 5,292,278

[45] Date of Patent: Mar. 8, 1994

[54] METHOD FOR REDUCING FECAL LEAKAGE AND CONTAMINATION DURING MEAT AND POULTRY PROCESSING

[75] Inventors: Norbert D. Neal, Cross Plains, Wis.; Robert E. Cook, Alexandria, Va.

[73] Assignees: The United States of America as represented by the Secretary of Agriculture, Washington, D.C.; Oscar Mayer Foods Corp., Madison, Wis.

[21] Appl. No.: 860,953

[22] Filed: Mar. 31, 1992

Related U.S. Application Data

[63] Continuation of Ser. No. 785,831, Oct. 31, 1991, Pat. No. 5,120,267, which is a continuation of Ser. No. 619,237, Nov. 28, 1990, Pat. No. 5,083,975.

[51] Int. Cl.$^5$ ............................................. A22C 21/00
[52] U.S. Cl. ..................... 452/176; 452/120; 128/654; 536/21; 528/68
[58] Field of Search ............. 452/106, 176, 120, 116, 452/109; 536/21; 528/68; 604/257, 175; 128/654, 401

[56] References Cited

U.S. PATENT DOCUMENTS

| | | | |
|---|---|---|---|
| 3,906,948 | 9/1975 | Uass | 128/654 |
| 4,057,535 | 11/1977 | Lipatova et al. | 528/68 |
| 4,064,107 | 12/1977 | Stackman et al. | 528/68 |
| 4,654,327 | 3/1987 | Van Der Eerden | 536/21 |
| 4,899,421 | 2/1990 | Uandereerden | 452/106 |
| 4,924,551 | 5/1990 | Greenbank et al. | 452/106 |
| 5,083,975 | 1/1992 | Neal et al. | 452/176 |
| 5,114,380 | 5/1992 | Larsen | 452/176 |
| 5,120,266 | 6/1992 | Aubert | 452/106 |
| 5,120,267 | 6/1992 | Neal et al. | 452/176 |

Primary Examiner—Willis Little
Attorney, Agent, or Firm—Lockwood, Alex, FitzGibbon & Cummings

[57] ABSTRACT

Fecal leakage and contamination from the vent opening of an animal carcass during slaughtering and processing methods is reduced or eliminated by applying a curable adhesive composition to the vent opening and permitting the applied curable composition to cure to form a cured firmly adherent vent seal after slaughtering but prior to other processing steps. In a preferred embodiment, the curable adhesive comprises a cyanoacrylate adhesive which cures in a matter of seconds under processing conditions to form a cured vent seal which retains its sealing integrity even upon exposure to high temperature and high humidity environments encountered at downstream processing stations. The curable sealing compositions are safe in the fully-cured state and do not liberate undesirable materials during curing.

4 Claims, No Drawings

METHOD FOR REDUCING FECAL LEAKAGE AND CONTAMINATION DURING MEAT AND POULTRY PROCESSING

CROSS-REFERENCE TO RELATED APPLICATIONS

This application is a continuation of prior co-pending application Ser. No. 785,831, filed Oct. 31, 1991, now U.S. Pat. No. 5,120,267 which is in turn a continuation of application Ser. No. 619,237, filed Nov. 28, 1990, now patented as U.S. Pat. No. 5,083,975.

BACKGROUND OF THE INVENTION

The present invention relates to the field of slaughtering and processing animals to provide meat products. More particularly, it relates to a new and improved method for slaughtering and processing animals including poultry such as chickens and turkeys as well as red meat sources including cows, pigs, sheep and the like wherein leakage of fecal materials is prevented by sealing the vent of the animal with a curable adhesive to form a vent seal.

Commercial processing of freshly-killed animals is presently a multi-step process often employing various semi-automatic conveyor systems for transporting a carcass sequentially through different processing areas or stations. In the following discussion, the description may concentrate primarily on the processing of freshly-killed poultry or fowl such as chickens and turkeys, to exemplify a multi-step slaughtering and processing operation. It should be readily apparent to those skilled in the art that the description with little or no modifications might also apply to commercial slaughtering and processing of other animals, including those animals which are sources for beef, pork, lamb, veal and the like.

Commercial processing of freshly-killed fowl or poultry requires a number of steps including defeathering the carcass of the bird and typically ending with a cleaned carcass being cut into parts suitable for cooking or with the entire carcass being preserved for cooking. More particularly, in a modern automated commercial processing plant, birds are conveyed or indexed through a plurality of consecutive work stations or areas. A typical arrangement or succession of work stations includes: a slaughtering station, whereat the throat of an invertedly suspended bird is cut and blood is permitted to drain; a scalding station, whereat the carcass is submerged in an elongate trough of heated water to facilitate defeathering, a picking station, whereat spinning rubber fingers impact the outside of the carcass to pull out the feathers; a New York Washing Station, whereat the exterior of the birds is washed down by spraying with an unheated aqueous solution; a hock-cutting station whereat the feet are removed; and an evisceration station whereat the internal organs are removed from the remainder of the carcass.

These processing steps in commercial poultry processing operations are subject to governmental regulation and on-site inspection for health and sanitary purposes.

Removal of fecal matter or other materials from the intestines of freshly-killed birds or other animals is desired at an early stage in processing the bird or animal carcasses. Fecal material remaining in the vent or intestines of the animal during processing and especially when the vent or viscera are removed, may become dislodged or is likely to leak out of the intestine or vent opening and fall into or onto the carcass, leading to rejection of that carcass by health inspectors.

Moreover, a substantial problem encountered in modern semi-automated processing equipment arises from the fact that the digestive tract organs are sometimes cut or otherwise opened during the eviscerating procedures so that ingesta or fecal material or other contents of the intestine may be released into the abdominal cavity of the bird which may lead to rejection of the bird by health inspectors. Fecal leakage onto the exterior portion of the carcass or elsewhere in the interior portions may also lead to rejection of that carcass.

One prior approach to removing fecal matter involves squeezing or kneading the large intestine and cloaca of the birds to force any remaining fecal material from the bird. This is usually done manually and cannot effectively be accomplished at a rate which is compatible with the desired rates of operation of the bird conveyors in modern poultry processing facilities.

Another approach to the problem involves the use of a suction probe inserted into the vent of the bird. Loose fecal matter within the vent is supposedly withdrawn by the suction applied to the probe. Suctioning vent cleaners of the prior art have not been particularly satisfactory, however. The probes often cannot remove all the loose fecal material due to the absence of air within the vent to create an air flow for entraining the fecal matter into the suction probe. Efforts to overcome this problem by increasing the amount of suction can actually work to suck out part of the intestine itself, thereby damaging the bird, often causing fecal leakage instead of preventing it.

Water flush and suction probe apparatus have also been employed wherein water is injected into the vent area from one portion of the probe and is collected by suction in another area of the probe. The flow of water is intended to mix with any fecal materials remaining in the cloaca and intestinal tract to provide an improved level of cleaning of the interior of the bird.

A major problem associated with poultry processing in particular is that after the birds are slaughtered, they are placed in large heated vats of aqueous scalding solution preparatory to plucking or defeathering operations. Large amounts of water must be heated to scalding temperature in these vats to facilitate defeathering. The freshly slaughtered fowl if not previously cleaned may discharge fecal materials and other intestinal contents involuntarily into the scald water which is undesirable.

Accordingly, to overcome the shortcomings of the prior art processing apparatus and method, it is an object of the present invention to provide a new and improved method for slaughtering and processing animals.

SUMMARY OF THE INVENTION

In accordance with these and other objects, the present invention provides a new and improved method for processing a live animal to provide a meat product. The processing method includes the steps of slaughtering the animal and thereafter eviscerating the animal. In accordance with this invention, the improvement comprises applying an effective amount of a curable sealing composition to the vent of the slaughtered animal and curing said sealing composition to provide a cured, firmly-adherent, substatially leak-free vent seal, after the slaughtering step and before the eviscerating step.

The substantially leak-free vent seals provided in accordance with the method of this invention substantially prevent or reduce leakage of fecal materials from the vent during subsequent handling and processing steps of the slaughtered animal carcass.

In accordance with this invention, the curable sealing composition may comprise a one or a two-part adhesive composition capable of rapidly curing, in a matter of seconds under the processing conditions generally presently employed in commercial processing plants and operations. Preferably, the curable adhesive composition will comprise a one-part composition which rapidly cures under processing conditions to form a fully cured firmly adherent vent seal which will remain effectively sealed in the vent upon exposure to subsequent processing conditions such as the scalder wherein the sealed vent will be exposed to high temperature and high humidity conditions.

Preferably, the curable adhesive sealing composition will not liberate undesired materials during the curing and cures to a fully cured composition which is desirable to the remainder of the meat on the carcass. Moreover, in chicken and turkey processing, the intestines or offal of the birds are frequently used after evisceration and further processing for further food products, i.e., in animal feeds. For example, the offal may be removed in the evisceration step, and rendered by washing and cooking, for example and then be ground up and added into feed for turkeys or other uses. Accordingly, it is important that the adhesive or curable sealant used to form the cured vent seal be one that provides a cured product which may safely be incorporated into the animal feed in small amounts.

If the eviscerated offal including the adhesive vent seal, in accordance with this invention, is not going to undergo further processing for providing additional food products, greater leaway may be used in selecting the curable sealing composition for forming the curable seal.

The cure mechanism by which the curable composition cures or hardens to form the vent seal may vary from adhesive composition to composition. For example, the seal may be from an anaerobically curable adhesive or may cure upon exposure to atmospheric moisture or upon exposure to some activating energy source such as high intensity visible light or ultraviolet light.

In accordance with the preferred embodiment, cyanoacrylate curable adhesives are preferred because they have been preapproved for surgical use in humans by the FDA and, in addition, they otherwise meet the requirements for the curable composition required in the method of the invention. The cyanoacrylate curable adhesives are abundantly available commercially and may be readily employed in current commercial processing plants and operations.

The curable composition for forming the vent seal in accordance with this invention, may be applied in an effective amount by any method known to those skilled in the art including dripping, dropping, brushing, coating, spraying, painting, spreading, injecting, pipetting, rolling, knifing or wiping the adhesive composition which is effective to apply a sealing amount of the curable adhesive onto or into the vent opening or anus of the animal or poultry being processed.

In accordance with the present invention, the application of the curable adhesive causes a fully-cured firmly adherent vent seal to be formed at the vent opening of the animal which prevents or eliminates the possibility of leakage of fecal material from the intestine during further processing steps and handling. The intestinal tract and its contents generally remain sealed or closed, in accordance with the present invention, until the intestine is later removed by evisceration equipment. As a result, the abdominal cavity and the remainder of the carcass remain substantially uncontaminated.

Other objects and advantages of the present invention will become apparent from the following detailed description of the invention and illustrative examples.

DETAILED DESCRIPTION OF THE INVENTION

In accordance with its broadest aspects, the present invention provides a new and improved method for reducing leakage of fecal material during slaughtering and processing of an animal which comprises gluing the vent opening or anus of the animal shut after slaughtering, but prior to all or any selected further processing steps. Practice of the present method produces an intermediate animal product which comprises a slaughtered carcass having an adhesively sealed vent opening prepared for further conventional processing.

The curable adhesive composition for use in the method of the present invention must cure within very short time periods, on the order of a few seconds immediately after being applied to the vent opening or anus of the animal carcass under the temperatures and conditions frequently encountered in the slaughtering and processing environments. Varying degrees of humidity may be encountered in the processing plants and processing environments may range in temperature from as low as 20° F. to as high as 110° F., depending on the season of the year. Accordingly, the curable sealing composition must cure to form a substantially solid, fully-cured, firmly-adherent vent seal or plug which effectively occludes the vent opening and obstructs and prevents material from the interior of the intestine or vent of the animal from leaking outwardly through or from the vent opening or anus.

The cured vent seal should remain firmly adhered or adhesively bonded to the tissues forming the vent. The seal should remain in tact during substantially all subsequent processing steps including steps such as dipping the bird into a boiling, scalding solution.

In this connection, the curable adhesive may be applied to the vent opening after slaughtering substantially anywhere along the succession of work stations. Preventing leakage during the evisceration step is an important concern and accordingly the adhesive vent seal may be applied after the washer but before the evisceration station or before the washing station. It is especially desirable to provide the seal after slaughter but before the scalding bath to prevent contaminating the scalder bath water. It has been observed that some picker equipment is so forceful that it causes tearing of the membranes of the vent adjacent the vent seal. The adhesive remains bonded to the membranes but the membranes pull away from the tissues is to which they are attached. If this occurs, a re-application of adhesive can reseal the vent prior to further processing.

The curable sealing composition may comprise a one part or two part sealing composition and may be provided in a drop-forming liquid form or in a paste form including fillers or other additives.

In accordance with the preferred embodiment, the curable sealing composition comprises an anaerobic or moisture-curable cyanoacrylate adhesive composition which is liquid and may be applied in the form of drops. Anaerobic cyanoacrylate adhesive materials are commercially available and are now well known. As presently advised, it is believed that certain cyanoacrylate-based curable adhesive compositions are approved for use in surgical procedures where sutures are inappropriate such as in liver and spleen surgery. Cyanoacrylate adhesives may be obtained from Loctite Corporation, as well as from other commercial sources.

Illustrative anaerobic cyanoacrylate curable sealing compositions for use in the present method are described in U.S. Pat. Nos. 3,300,547 and 3,435,012, the disclosures of which are specifically incorporated herein by reference. The cyanoacrylate anerobic adhesives are preferred at this time because they cure within seconds to form a firmly-adherent seal at the vent opening which can withstand subsequent exposure to processing conditions without pulling away, rupturing or losing the sealing integrity (with the possible exception of the picking step mentioned above). The anaerobic cyanoacrylates do not liberate undesired materials during curing and cure to a suitably hardened solid state.

Although the cyanoacrylate adhesives may be preferred, other adhesives may meet the functional requirements required for this context of use. Other curable sealing compositions may include visible- or ultraviolet light-activatable adhesives, based on acrylates, silicones, urethanes or other polymerizable monomers. The curable sealing composition may comprise a two component composition wherein a first part of the adhesive is applied to the vent of the animal and a curing catalyst, crosslinker and/or cure accelerator, comprising the second part, may be dropped into contact with the first part, to start the curing reaction. Regardless of whether a one part or a two part composition is used, ultimately, an in situ cured and formed vent seal is provided.

In accordance with this invention, the improvement in a processing or evisceration operation is provided by applying at least once an effective amount of a curable sealing composition to the vent of the slaughtered animal and curing said sealing composition to provide a cured, firmly adherent, substantially leak-free vent seal. The vent seal should be formed after the slaughtering step and before the eviscerating step to prevent leakage of fecal materials from the vent during processing.

An effective amount of sealing composition will vary from animal to animal being processed and also will vary based upon the particular curable adhesive employed. In the case of the preferred cyanoacrylate anaerobic adhesives, an effective amount to be added may vary from a few drops in the case of a chicken to up to 5 or 25 cc of the curable adhesive composition or more for a cow, for example. The cured vent seal should be firmly adherent to the vent opening and the tissue sidewalls forming the vent opening. The level of bond strength or adhesion required is difficult to quantify; however, a determination of whether an effective seal has been formed can be pretested by manually squeezing the intestine or cloaca of the animal being processed so that gasses or material contained therein press against the seal. By varying the squeeze pressure, one can qualitatively determine that the vent seal can withstand a considerable buildup of back pressure before becoming dislodged or before permitting leakage of fecal materials from the vent to occur.

It is preferable to prevent fecal leakage and contamination as soon as possible after slaughtering the animal. Accordingly, the curable adhesive sealing composition is preferably applied to the vent opening of the animal as quickly as possible after slaughtering and preferably within five minutes or less.

In accordance with a preferred method in accordance with the invention, birds are first slaughtered in accordance with conventional procedures and are conveyed to a vacuum or suctioning station where the vents are vacuumed by means of hand-held vacuum guns prior to application of the curable adhesive to form the vent seal. The guns may be those described in U.S. Pat. Nos. 3,137,031 and 3,116,513 or they may be similar to those described in U.S. Pat. No. 4,876,767.

After vacuuming of the vent and lower intestine of the freshly-slaughtered poultry carcass has been performed, the curable sealing composition is applied to the vent opening to rapidly cure to form a firmly-adherent plug or vent seal. In the case of anaerobic cyanoacrylate adhesives, the curable sealing composition may be stored and will remain in a liquid uncured state if exposed to oxygen. Similarly, the moisture curable cyanoacrylate adhesives remain in a liquid uncured state if stored in a moisture-proof container but, upon inserting it into the vent opening of the animal carcass, being exposed to atmospheric and animal tissue moisture, it will begin a rapid curing process to form the cured seal within a matter of seconds under ordinary processing temperatures and moisture conditions encountered in current commercial processing operations.

The cyanoacrylate adhesive composition useful as the curable sealing composition will be low viscosity liquid which may be applied to the vent opening in the form of drops or it may be more actively applied through a pipetter or brush coater, sprayer or other applicator means and/or operation. It is important that the curable sealing composition be introduced or applied to the vent opening in an effective amount and in a manner so that a firmly adherent plug seal will be formed. The cured adhered seal fully occludes the vent or adhesively bonds opposing sidewalls forming the vent in a closed position which prevents or substantially eliminates the possibility for leakage of materials from the interior of the intestine onto the outside or inside of the bird or animal carcass. Although droppable liquid adhesives are preferable for use in the method of the present invention, curable paste adhesives deliverable from a tube or applicator may also be useful.

In accordance with conventional meat processing methods for red meat animals, such as beef, pork, lamb, mutton and veal to name but a few, these animals tend to be considerably larger than poultry. Accordingly, a circular cut generally circumscribing the vent opening or anus of these animals is made in the carcass and the entire circumscribed anus area is pulled outwardly of the carcass, pulling a portion of the intestine through the vent cut. Thereafter, the dislodged intestine immediately adjacent the anus or vent opening is tied with a string or other clamping means to prevent intestinal leakage during further processing steps.

In accordance with this invention, an improvement in these methods is provided by applying the curable sealing composition after tying, knotting or clamping, at the terminal end portion of the knotted intestinal tract at or about the anus. This effectively glues, bonds or adheres the sidewalls of the anus or the intestines to each other to prevent leakage. Alternatively, a cured plug which firmly adheres to the sides of the anus or the intestines is provided forming a barrier to leakage or flow of fecal materials from the intestines to the outside world during later processing steps.

In accordance with the present invention, a currently used commercial apparatus for processing poultry and red meat animals may be readily modified in accordance with another aspect of this invention by providing a sealing station immediately following a slaughtering station or a tying, knotting or vacuuming station, as the case may be, but generally before any scalding, defeathering, dehairing or skin removal stations, which may occur along the processing assembly line in the plant.

As has been mentioned above, the invention contemplates a broad number of ways in which the curable composition may be applied to the appropriate area on the freshly-slaughtered carcass and at various locations along the plant processing line. It is believed preferable to apply and cure the adhesive as early on in the process as possible to dramatically prevent leakage from occurring at any point thereafter. Moreover, the invention contemplates adding the adhesive to form or re-form the vent seal more than once during processing if desired or required. The means for applying the curable adhesive may include an operator applying it by hand, for example by applying as little as two or three drops of Krazy Glue ®-type, cyanoacrylate adhesive to the vent opening of the bird as the bird passes from a vacuum/suction station to a scalding station. Alternatively, mechanical and/or vision-controlled robotic arms or other automated equipment may be developed to apply the sealing composition to the vent of the bird.

Other objects and advantages of the present invention will become apparent from the following Examples.

EXAMPLE 1

In this Example a manual procedure for testing the ability of a commercially available cyanoacrylate adhesive to rapidly cure to form a cured, firmly-adherent vent seal in a turkey processing plant under turkey processing conditions is performed. In accordance with the method, a freshly-slaughtered turkey is selected for purposes of this test in a commercial turkey processing plant. In accordance with plant operation, the turkey carcass is suspended upside down by its legs on an overhead conveyor provided with leg gripping hooks. The vent opening of the turkey is disposed in an upward-facing orientation.

The turkey carcass is passed through a slaughtering station wherein its throat is cut. The identified turkey carcass is halted after slaughtering and a commercially available cyanoacrylate adhesive, Krazy-Glue® Brand, available over the counter from Loctite Corporation is applied to the vent opening. The adhesive is applied by dropping a total of five drops onto the vent opening. The dropped adhesive flows into the crevices of the vent and immediately begins curing until a hardened, fully cured, firmly adherent seal disposed in the vent opening is formed in about ten seconds.

An abdominal slit is made in the abdomen of the turkey and the turkey cloaca is squeezed by hand to apply back pressure to the cured vent seal formed in the vent opening of the turkey carcass. Considerable squeeze pressure is applied and no leakage of fecal material around the cured seal is observed. From this it is concluded that the cyanoacrylate adhesive forms a suitable, firmly-adherent seal for use in turkey processing operations which is effective to prevent leakage of fecal material from the vent opening during processing.

Thereafter, another bird is treated as above except for abdominal slit and the carcass is dipped into a scalding bath station in a turkey processing plant and after permitting the carcass to cool, the cloaca is again squeezed by hand to test the integrity of the vent seal after being exposed to boiling water in the scalder. After applying significant squeeze pressure the vent seal is visually observed to be still firmly-adherent and intact. Moreover, after applying squeeze pressure in an effort to dislodge the vent seal no fecal leakage is observed. From this it is concluded that the cyanoacrylate adhesive is an effective vent seal forming composition for use in the new and improved method in accordance with this invention.

EXAMPLE 2

In this Example the liquid cyanoacrylate adhesive is tested in accordance with the method of Example 1 in a beef processing plant. A freshly-slaughtered cow is identified as the carcass for testing in the experiment. The cow is freshly slaughtered in a modern slaughtering operation and is suspended from a processing plant conveyor. The bung hole or anus of the cow is circumscribed with a circular cut and the bung hole and attached intestinal tissue is pulled out and tied with string in accordance with standard operating procedures. The liquid cyanoacrylate adhesive composition is applied by hand by injecting approximately 5 ccs into the anal opening immediately adjacent the knotted intestine portion. The adhesive is observed to cure rapidly in a matter of seconds after application. After one minute, if the intestine of the cow is locally squeezed adjacent the in situ formed or cured seal in an effort to discharge fecal materials contained in the intestine through the knot and cured vent seal out of the anus, no leakage of fecal material is observed.

EXAMPLE 3

The method of the present invention was tested in a commercial processing plant generally following the method described in Example 1, except that a couple of drops of Super Glue adhesive were manually applied to twenty turkeys approximately six feet before the hock cutter station. The line was operating at about 25 feet per minute. The applied adhesive had about 15 seconds to cure before being exposed to water spray from the hock cutting equipment.

The glue was observed to flow down into the vent area and did not flow or run over the vent.

It was observed that untreated turkeys both before and after the twenty birds which were treated exhibited fecal leakage issuing from their vent areas. The twenty treated turkeys did not exhibit any fecal leakage.

Manual examination of the twenty treated turkeys revealed that the vent areas of the birds remained pliable after being glued and the glued area did not stick to a finger when the vents were touched.

EXAMPLE 4

In a commercial turkey processing plant, 2-3 drops of Super Glue adhesive were applied to the vent of at least one recently-slaughtered turkey at a location between the slaughtering station and the scalding station. The speed of the line was about 25 feet per minute so that the glue had about 10-15 seconds to cure before the turkey carcass was subjected to four passes through a heated scalding trough about 20 feet in length which was heated to 140° F. After being submerged in the heated bath for about 4-5 minutes, the carcass was removed from the bath and dried by hand with a cloth. Visual and manual examination of the vent seal revealed that a hardened adhesive plug, firmly adhered to all of the sides of the vent opening remained after the scalding treatment.

As has been mentioned above, other adhesive formulations curable under processing conditions may be used in substitution for the cyanoacrylate adhesives described herein. The cyanoacrylate type adhesives were selected because they had obtained previously FDA approval in connection with surgical procedures for use with humans and were known to cure to form solid sealing materials. Although an anaerobic or moisture-curable cyanoacrylate curable adhesive formulation was used, other adhesive formulations curable by other mechanisms, such as the light activated types might be useful. In addition to cyanoacrylate-based adhesives, other activatable acrylate adhesives might be used or curable silicones or urethane-based adhesives may also find application herein. Other adhesives may also include epoxidic adhesive formulations. The use of a particular adhesive will have to be tested to determine whether or not it forms a firmly adherent adhesive bond with the tissue of the vent opening to form a cured vent seal having an integrity useful for preventing fecal leakage in subsequent processing. In addition, the selection may be based on whether or not the intestines are later to be used as a component of turkey feed or in some other use which may effect the choice of materials for the curable sealant.

Each of the above mentioned patents are specifically incorporated herein by reference in their entireties.

Although the present invention has been described with reference to certain preferred embodiments, modifications or changes may be made therein by those skilled in the art without departing from the scope and spirit of the present invention as defined by the appended claims.

What is claimed is:

1. A pre-eviscerated poultry product comprising a slaughtered poultry carcass having a sealed cloacal vent opening including a cured firmly adherent adhesive composition.

2. A poultry product as defined in claim 1 wherein said adhesively sealed vent opening comprises a cured, firmly adherent cyanoacrylate adhesive composition.

3. A poultry product as defined in claim 1 wherein said poultry product is turkey.

4. A poultry product comprising a slaughtered poultry carcass having a cloacal vent opening sealed by means of a cured, firmly adherent adhesive composition.

* * * * *